United States Patent
Kataoka

(10) Patent No.: US 6,639,648 B2
(45) Date of Patent: Oct. 28, 2003

(54) OPTICAL WAVELENGTH TUNING METHOD AND FABRY-PEROT TYPE OPTICAL TUNER

(76) Inventor: Shoei Kataoka, 3-20-16, Shibakubo-cho, Nishitokyo-shi, Tokyo (JP), 188-0014

(*) Notice: Subject to any disclaimer, the term of this patent is extended or adjusted under 35 U.S.C. 154(b) by 191 days.

(21) Appl. No.: 09/861,835

(22) Filed: May 21, 2001

(65) Prior Publication Data

US 2002/0005918 A1 Jan. 17, 2002

(30) Foreign Application Priority Data

May 25, 2000 (JP) .......................... 2000-154087
Mar. 22, 2001 (JP) .......................... 2001-81914

(51) Int. Cl.$^7$ .............................. G02F 1/13
(52) U.S. Cl. ........................................ 349/198
(58) Field of Search ...................... 349/198; 359/589, 359/618, 260; 385/39, 8, 28

(56) References Cited

U.S. PATENT DOCUMENTS

| | | | | |
|---|---|---|---|---|
| 4,251,137 A | * | 2/1981 | Knop et al. ............. | 349/201 |
| 5,150,236 A | * | 9/1992 | Patel ....................... | 349/198 |
| 5,321,539 A | * | 6/1994 | Hirabayashi et al. ... | 349/198 |
| 6,154,591 A | * | 11/2000 | Kershaw ................ | 385/39 |
| 6,215,592 B1 | * | 4/2001 | Pelekhaty .............. | 359/618 |

OTHER PUBLICATIONS

J. Jerman et al.; "A Miniature Fabry–Perot Interferometer with a Corrugated Silicon Diaphragm Support"; Solid–State Sensors and Actuator (Workshop) 1990 IEEE: pp. 140–144.
K. Sivalingam, et al.; Otical WDM Networks Principles and Practice; Kluwer Academic Publishers; pp. 41,42.

* cited by examiner

Primary Examiner—Toan Ton
(74) Attorney, Agent, or Firm—Norris McLaughlin & Marcus

(57) ABSTRACT

There is provided a small and lightweight Fabry-Perot type optical tuner. By changing the distance between the reflector plates 3A and 3B with an applied voltage across said reflector plates 3A and 3B, wherein said reflector plates 3A, 3B are supported with coil springs 8A, 8B, and at the same time by changing the refractive index of the liquid crystal material 9, i.e. by utilizing both changes of distance d and refractive index n, an optical tuning can be obtained over a wide range of optical wavelength.

6 Claims, 7 Drawing Sheets

| | |
|---|---|
| 1 | Fabry-Perot type optical cavity |
| 2A, 2B | Transparent substrate plate |
| 3A, 3B | Reflector plate |
| 4A, 4B | Terminal |
| 5A, 5B | Male Screw |
| 6A, 6B | Female Screw |
| 7A, 7B | Gear |
| 8A, 8B | Coil spring |
| 9 | Liquid crystal material |
| 10 | Multiplex transmission line |
| 11, 12 | Optical fiber |

| | |
|---|---|
| 1 | Fabry-Perot type optical cavity |
| 2A, 2B | Transparent substrate plate |
| 3A, 3B | Reflector plate |
| 4A, 4B | Terminal |
| 5A, 5B | Male Screw |
| 6A, 6B | Female Screw |
| 7A, 7B | Gear |
| 8A, 8B | Coil spring |
| 9 | Liquid crystal material |
| 10 | Multiplex transmission line |
| 11, 12 | Optical fiber |

OPTICAL WAVELENGTH TUNING METHOD AND FABRY-PEROT TYPE OPTICAL TUNER

BACKGROUND OF THE INVENTION

1. Field of the Invention

The present invention relates to an optical wavelength tuning method and a Fabry-Perot type optical tuner, which are used in the optical wavelength analyser and the optical wavelength division multiplexing communication.

2. Description of the Related Arts

In recent years, optical fibers, which are able to transmit large amount of data at high speed, have become to be used in place of copper wires.

For instance, as shown in FIG. 9, the multiplexer 101 at the sending side, and the demultiplexer 102 at the receiving side are connected with an optical fiber 103, and the optical signals $P_1, P_2, \ldots P_n$ of respective wavelengths $\lambda_1, \lambda_2, \ldots \lambda_n$, which are converted from electrical signals $S_1, S_2, \ldots S_n$ respectively with electro-optical transducers 104, are multiplexed and transmitted through an optical fiber 103 to a demultiplexer 102 at the receiving side and these optical signals of $P_1, P_2, \ldots P_n$ of wavelength $\lambda_1, \lambda_2, \ldots \lambda_n$ are respectively converted to the electrical signals $S_1, S_2, \ldots S_n$ with photo-electric transducers 105. In general, optical signals of the wavelengths 1.3–1.5 $\mu$m are used because of their small loss in an optical fiber.

Within this wavelength range, multiple optical signals $P_1, P_2, \ldots P_n$ with slightly different wavelength, are transmitted through an optical fiber 103 and respective optical signals are selectively chosen at the receiving side. This is called Wavelength Division Multiplexing technology.

At present, semiconductor lasers are used to produce optical signals, $P_1, P_2, \ldots P_n$ of wavelengths $\lambda_1, \lambda_2, \ldots \lambda_n$ respectively, and to select required optical signal, many optical filters corresponding to respective wavelengths $\lambda_1, \lambda_2, \ldots \lambda_n$ are switched by use of an electric motor, and thus an optical wavelength tuner is quite large in size (for instance, a product by OCLI, USA has a size of 10 cm*5 cm*2 cm, and a product by Santec, Japan, 4 cm*2 cm*0.8 cm) and it takes a time in operation and it is quite expensive.

To realize a small and inexpensive Fabry-Perot optical tuner, researches are now going on which use liquid crystal materials. However, these are not practical because of their very narrow tunable ranges, about 30 nm. (cf. "Optical WDM Networks Principles and Practice"; editors, Krishna M. Sivalingam and Suresh Subramaniam; Kluwer Academic Publishers, 2000, p.41, Table 2.2)

As mentioned above, conventional technology uses many optical filters and an electric motor is used to select and switch the desired optical wavelength, and thus it is inevitable that a whole device becomes bulky and expensive.

SUMMARY OF THE INVENTION

The purpose of the present invention is to provide small and inexpensive optical wavelength tuning method and a Fabry-Perot type optical tuner to obtain an optical signal of the desired wavelength, by controlling the distance between the reflectors of a Fabry-Perot type cavity with the electric voltage applied to the electrodes, and at the same time, by controlling the refractive index of a liquid crystal material filled in between the opposing reflectors.

Optical wavelength tuning method and a Fabry-Perot type optical tuner of the present invention have a special feature in the concurrent use of both the change of the distance between the reflector plates of the Fabry-Perot cavity and the change of the refractive index of liquid crystal material filled in between the reflector plates by applying an electric voltage across the opposing reflector plates of the Fabry-Perot cavity. By this means, an applying voltage needed is of order of only a few volts and the synergistic effect of the tuning function due to the change of distance between the reflector plates of the Fabry-Perot cavity and the tuning function due to the change of a refractive index of the liquid crystal material in the cavity gives an excellent tuning effect.

Namely, the first invention is an optical wavelength tuning method in which a tuning to a particular wavelength among the multiplexed optical signals transmitted through a multiplex transmission line to obtain a specific optical signal output is made possible by changing the distance between the reflector plates of a Fabry-Perot type cavity with distance changing unit, and at the same time by controlling the refractive index of the liquid crystal material, which refractive index is a function of the applied electric field thereto, filled in the Fabry-Perot optical cavity by controlling the applied electric field with electric field application unit.

The second invention is a Fabry-Perot type optical tuner comprising, a Fabry-Perot type cavity with variable distance opposing reflector plates, a distance control unit for controlling the distance between the opposing reflector plates, liquid crystal material filled in between the opposing reflector plates and having refractive index dependent on the applied electric field, and an electric field applying unit for applying an variable electric field strength to the liquid crystal material.

The third invention is a Fabry-Perot optical tuner described above, wherein the distance control unit are male screws to fit in the female screws at a transparent substrate plate of the two transparent plates supporting the respective reflector plates, and the distance between the two transparent substrate plates is controlled by turning the male screws.

The fourth invention is a Fabry-Perot optical tuner described above, wherein the distance control unit are the piezo-electric elements connecting the opposing transparent substrate plates to support the reflector plates, and the distance between the transparent substrate plates is changed by applying an electric voltage to the piezo-electric elements to elongate or to shrink the piezo-electric elements.

The fifth invention is a Fabry-Perot optical tuner described above, wherein the distance control unit are the elastic elements connected to the two transparent plates supporting reflector plates, and electrostatic attracting plates fixed at the respective transparent substrate plates, which control the distance between the transparent substrate plates according to the applied voltage against the elastic force of the elastic elements.

The sixth invention is a Fabry-Perot optical tuner wherein the electrostatic attracting plates are the electric field application unit to the liquid crystal material.

The seventh invention is a Fabry-Perot optical tuner, wherein the elastic elements are the flexible spacers between the transparent substrate plates.

This specification includes part or all of the contents as disclosed in the specification and/or drawings of Japanese Patent Applications No. 081914/2001 and No. 154087/2000, which are priority documents of the present application.

BRIEF DESCRIPTION OF THE DRAWINGS

A more complete appreciation of the invention and many of the attendant advantages thereof will be readily understood by reference to the following detailed description when considered in conjunction with the accompanying drawings, wherein.

EXPLANATION OF SYMBOLS

| Fabry-Perot type optical cavity | |
| --- | --- |
| 2A, 2B | Transparent substrate plate |
| 3A, 3B | Reflector plate |
| 4A, 4B | Terminal |
| 5A, 5B | Male Screw |
| 6A, 6B | Female Screw |
| 7A, 7B | Gear |
| 8A, 8B | Coil spring |
| Liquid crystal material | |
| Multiplex transmission line | |
| 11, 12 | Optical fiber |
| 13A, 13B | Piezo-electric element |
| 14A, 14B | Terminal |
| 15A, 15B | Electrode |
| 16A, 16B | Electrode |
| 17A, 17B | Terminal |
| 18A, 18B | Terminal |
| Plateau | |
| Overflow receptor | |
| 21A, 21B | Transparent substrate plate |
| 22A, 22B | Reflecting conductive layer |
| 23A, 22B | Flexible structure |
| 81A, 81B | Spacer |

DESCRIPTION OF THE PREFERRED EMBODIMENTS

Figure 1:
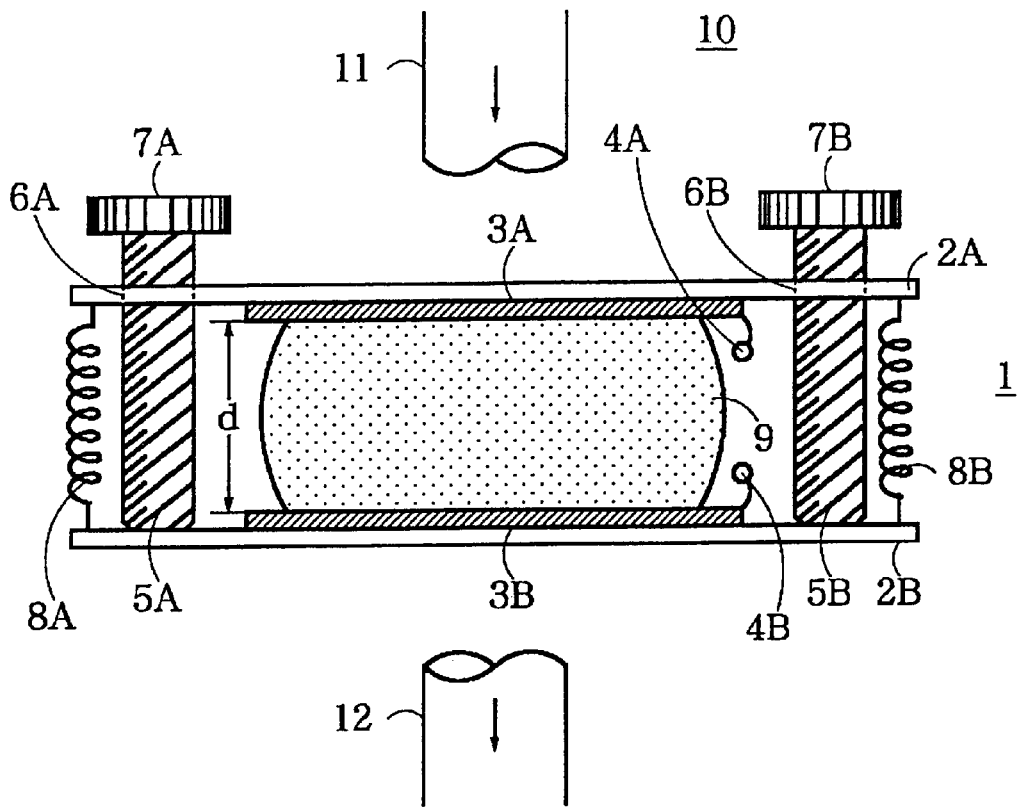
FIG. 1 is a cross section of the essential part of an embodiment of the Fabry-Perot type optical tuner of the present invention.

FIG. 1 shows a cross section of an essential part of an embodiment of the invented Fabry-Perot optical tuner. In FIG. 1, the Fabry-Perot optical cavity 1 comprises conductive reflector plates 3A, 3B attached to the two opposing transparent substrate plates 2A, 2B. These reflector plates 3A, 3B may be deposited on the substrate plates 2A, 2B by vacuum evaporation. These may also be made by laminating transparent electrodes and dielectric reflecting layers. The reflector plates 3A, 3B should be transparent to some extent, and at the same time reflective to some extent to constitute an optical cavity. The terminals 4A, 4B for voltage application are provided on the reflector plates 3A, 3B. The male screw 5A, 5B are provided at the central part of the two edges of the rectangular transparent substrate plates 2A, 2B. If required, the screws may be provided at the central part of the other two edges of the rectangular transparent substrate plates.

At the transparent substrate plates 2A, female screw holes 6A, 6B are provided and whereto the male screw 5A, 5B are inserted.

Figure 9:
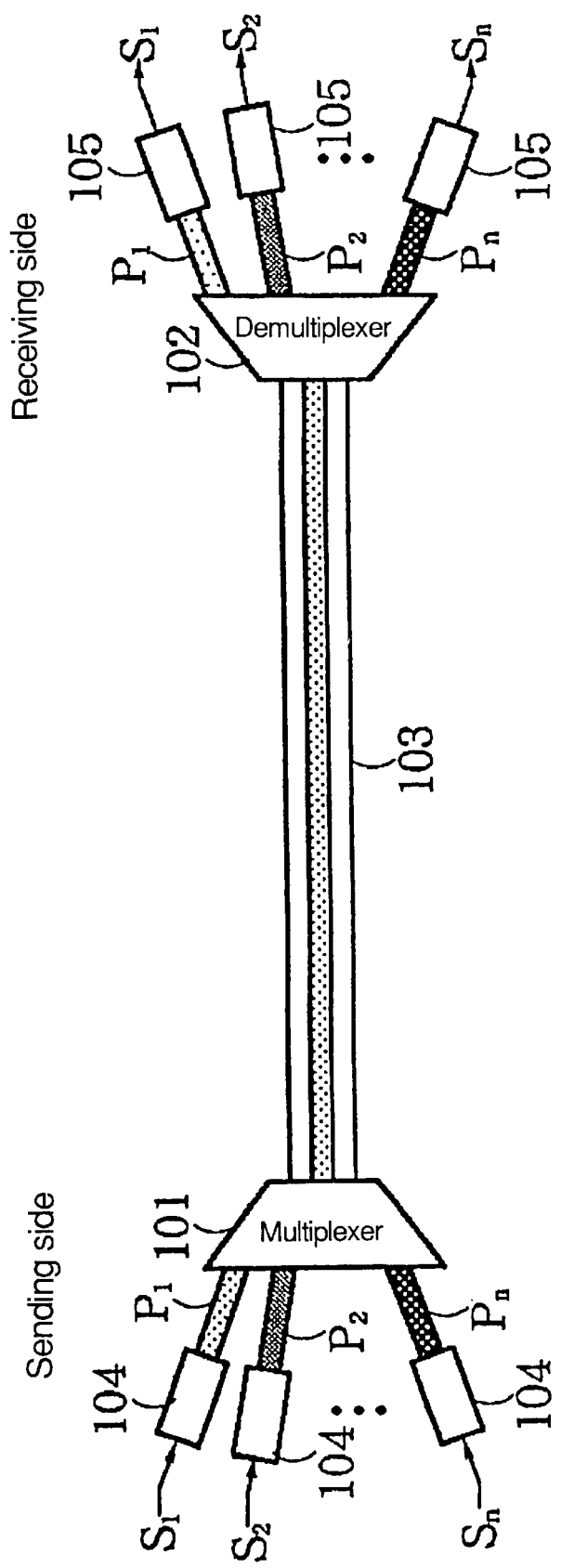
FIG. 9 is a view explaining optical wavelength division multiplexing technology.

The gears 7A, 7B are fixed on the heads of the male screws 5A, 5B and gear other gears of a driving power source (not shown). The coil springs 8A, 8B act in the direction of attracting or repulsing the transparent substrate plates 2A, 2B to prevent loose coupling between the mail screws 5A, 5B and the female screws 6A, 6B. If a tight coupling is obtained, then the coil springs 8A, 8B are not necessary. The liquid crystal material 9 shows a change in the refractive index under an applied electric field, and may homogeneously oriented nematic liquid crystal, chiralsmectic liquid crystal etc. The wavelength division multiplex transmission line 10 comprises optical fibers 11, 12 and the optical signal may be inputted from the optical fiber 11 just in the same way as shown by the optical fiber 103 in FIG. 9 of the conventional system. The optical fiber 12 is for the optical output signals.

The operation principle of the present invention will be explained. The rotation of the gears 7A, 7B connected to the source driver (not shown) leads to the rotation of the male screws 5A, 5B and the transparent substrate plate 2A with the male screws 6A, 6B moves downward or upward to keep the distance d between the reflector plates 3A and 3B to a desired value. At the same time, an electric voltage is applied across the terminals 4A and 4B to keep the refractive index n of the liquid crystal 9 to a desired value. Optical signal is inputted from the optical fiber 11.

Under this condition, resonant condition for the optical cavity 1 is given by equation (1).

[Equation 1]

$$m \cdot \lambda / 2n = d$$

$$\lambda = 2n \cdot d / m \quad (1)$$

where $\lambda$ is the optical wavelength in the air, m is an integer, and is considered to be a constant.

Because the wavelength in the liquid crystal material 9 is given by $\lambda/n$ and standing wave condition is obtained and resonance occurs when d equals integer times half the wavelength in the liquid crystal material.

As explained, in the embodiment of FIG. 1, the distance between the transparent substrate plates 2A and 2B, namely the distance d between the reflector plates 3A and 3B is changed by using mechanical rotation of the male screws 5A, 5B as a distance control unit, and at the same time the refractive index n of the liquid crystal material 9 is changed by the application of an electric field and thus large change of tuning wavelength can be obtained at a small value of the applied electric voltage.

Figure 2:
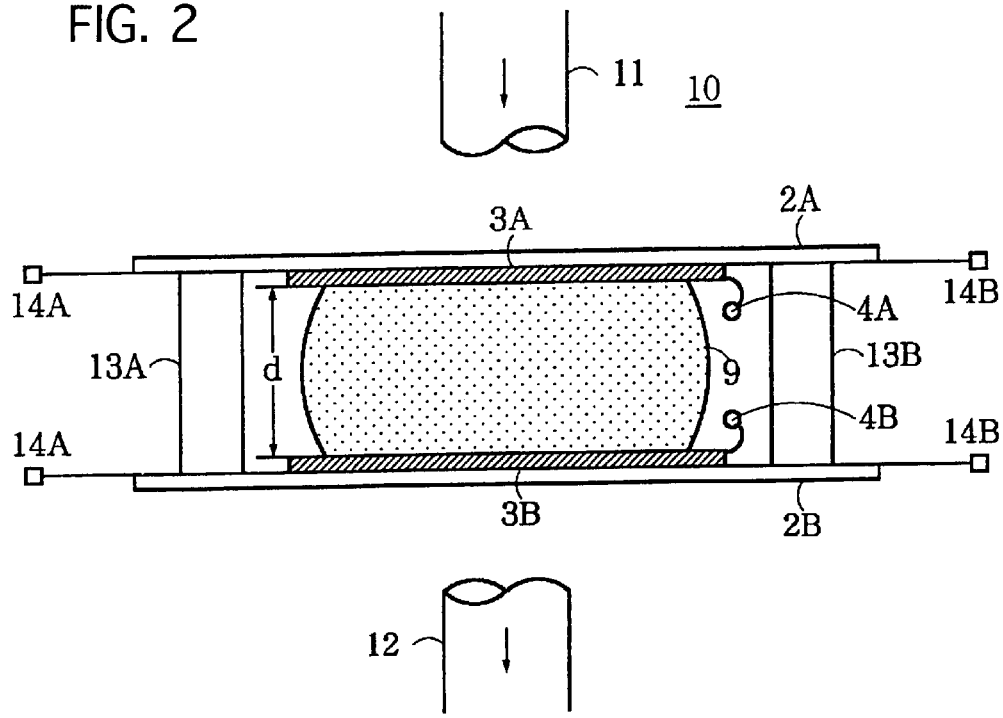
FIG. 2 is a cross section of the essential part of another embodiment of the present invention.

FIG. 2 shows another embodiment of the present invention, where piezo-electric elements are used as distance changing unit. In FIG. 2 piezo-electric elements 13A, 13B are provided with electric terminals 14A, 14B. Other structure is the same as in FIG. 1. Upon application of a voltage to the piezo-electric elements 13A, 13B, the sizes of the piezo-electric elements elongate or shrink, leading to the change of the distance d between the reflector plates 3A and 3B. At the same time, refractive index n of the liquid crystal material 9 present in the electric field produced by the applied voltage across the terminals 14A and 14B changes, and thus as a result, large variation in the tuning wavelength can be obtained just in the same way as in the embodiment shown in FIG. 1.

Figure 3:
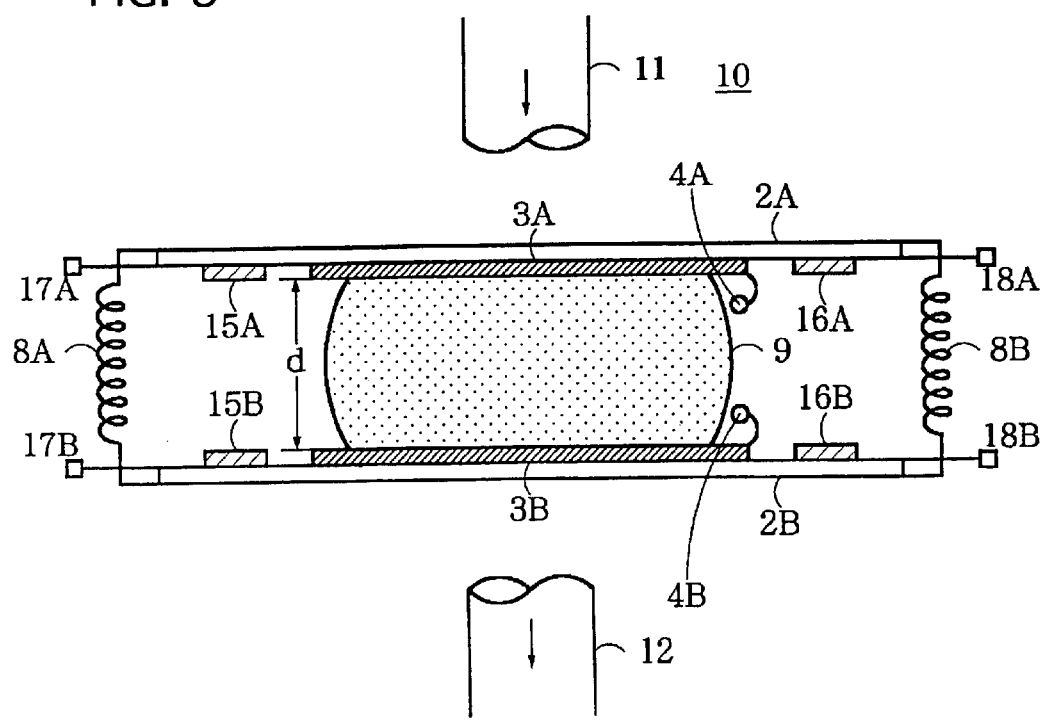
FIG. 3 is a cross section of the essential part of still another embodiment of the present invention.

FIG. 3 shows still another embodiment of the present invention, wherein electrostatic actuators are used as distance changing unit. In FIG. 3, the opposing electrodes 15A, 15b and 16A, 16B constitute electric actuators respectively with terminals 17A, 17B and 18A, 18B. Other structure is the same as in FIG. 1.

When a voltage V is applied across the terminals 17A and 17B, also across the terminals 18A and 18B, an electric field, V/d is produced between the electrodes 15A and 15B, and, 16A and 16B. And an electrostatic force $$f = \frac{1}{2}\varepsilon_0 \left(\frac{V}{d}\right)^2 \quad \text{[equation 2]}$$

acts per unit area. (where ∈o is the dielectric constant of the air) As a result, the distance between the reflector plates 3A and 3B changes, and thus large change of tuning wavelength can be obtained as in the embodiment of FIG. 1.

Figure 4:
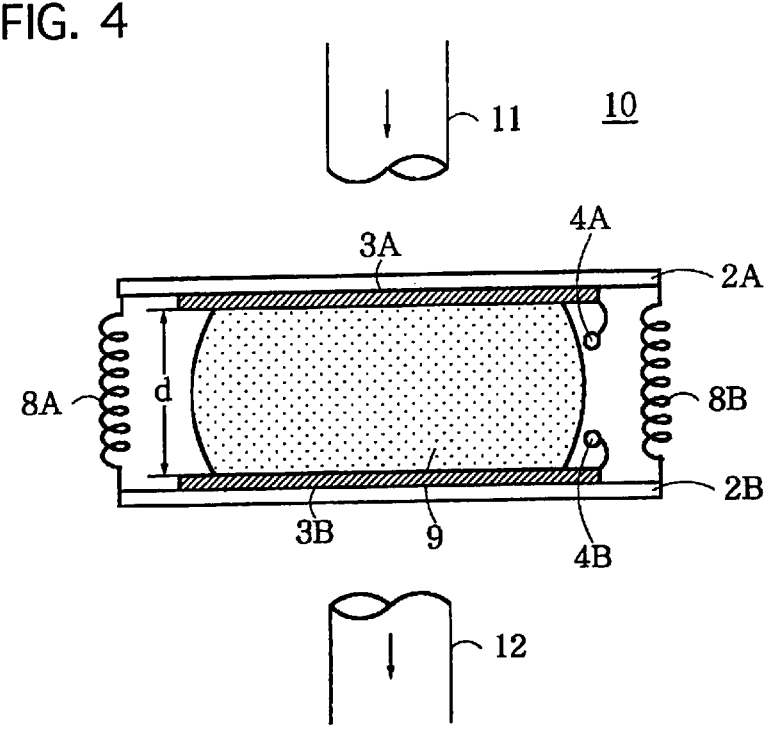
FIG. 4 is a cross section of the essential part of still another embodiment of the present invention.

FIG. 4 shows still another embodiment of the present invention, wherein the reflector plates 3A, 3b as voltage application unit to the liquid crystal material 9 in FIG. 3 are also used as electrostatic actuators of the distance changing unit at the same time.

Namely, in FIG. 4. liquid crystal material 9 is filled in between the reflector plates 3A and 3B, which also act as electrodes for the electrostatic attraction.

The reflector plates 3A, 3B are conductive, so these can be electrodes as well. When an electric voltage V is applied across the terminals 4A and 4B, an electric field of V/d is produced between the reflector plates 3A and 3B.

[equation 3]

$$f = \frac{1}{2}\varepsilon \left(\frac{V}{d}\right)^2 \quad (2)$$

As a result, an electrostatic force given equation (3) acts per unit area. By this force, the distance d decreases, and the refractive index n of the liquid material 9 also decreases, leading to the large change of the tunable optical wavelength by a small amount of an applied voltage with rather simple structure.

Figure 5A:
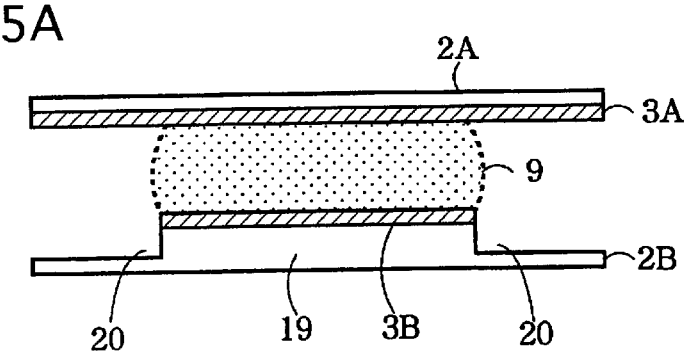
FIGS. 5A and 5B are cross sections of the essential parts of the overflow receptor for the liquid crystal material.
Figure 5B:
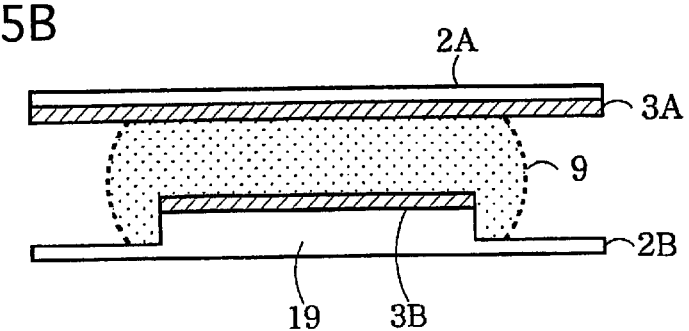

FIG. 5A and FIG. 5B show embodiments of the present invention, wherein overflow receptors 20 are provided to accommodate the overflow of the stressed liquid crystal material 9 by the movement of the transparent substrate plate 2A. That is, plateau 19 surrounded by the receptors 20 is provided on the transparent substrate plate 2B as shown in FIG. 5A. When the distance d decreases, the overflowed liquid crystal material 9 is accommodated as shown in FIG. 5B. This structure can be applied to the embodiments shown in FIGS. 1–4.

Figure 6A:
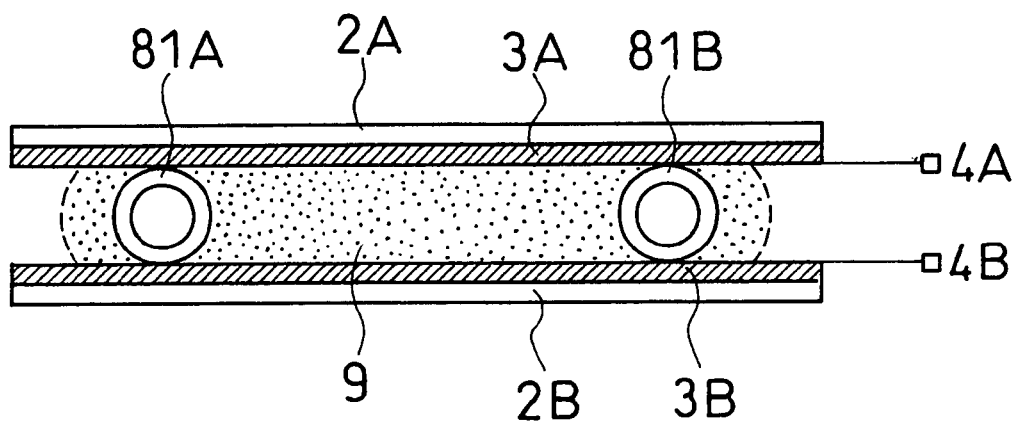
FIGS. 6A and 6B are cross sections of the essential parts of still other embodiments of the present invention.
Figure 6B:
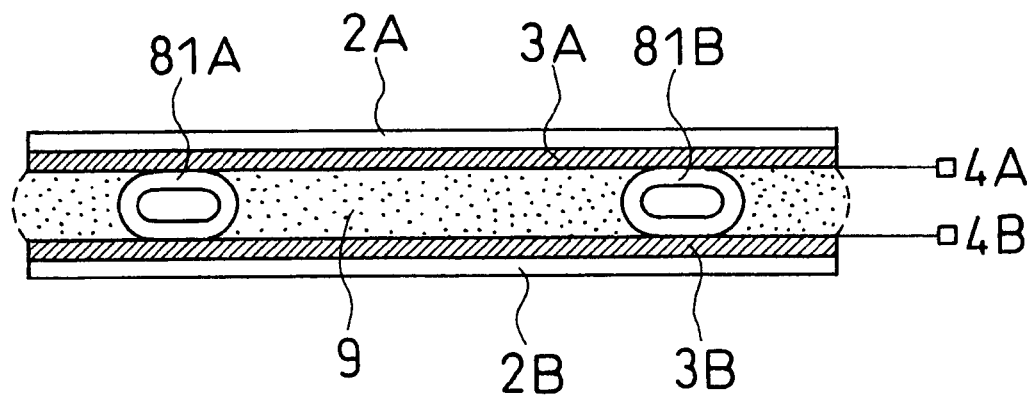

FIG. 6A and FIG. 6B show embodiments of the present invention, wherein hollow spacers 81A, 81B are inserted as flexible spacers between the transparent substrate plates 2A and 2B. When no voltage is applied across the terminals 4A and 4B, the hollow spacers 81A, 81b are of the shape of sphere or tube to keep the distance between the transparent substrate plates 2A and 2B constant as shown in FIG. 6A. However, when an electric voltage is applied across the terminals 4A and 4B, an electrostatic force is produced between the reflector plates 3A, 3B, which serve as the electrodes, to press and to deform the spacers 81A, 81B as shown in FIG. 6B, and to decrease the distance d between the reflector plates 3A and 3B, leading to a large change of tunable optical wavelength together with the decrease of the refractive index n of the liquid crystal material 9.

Figure 7:
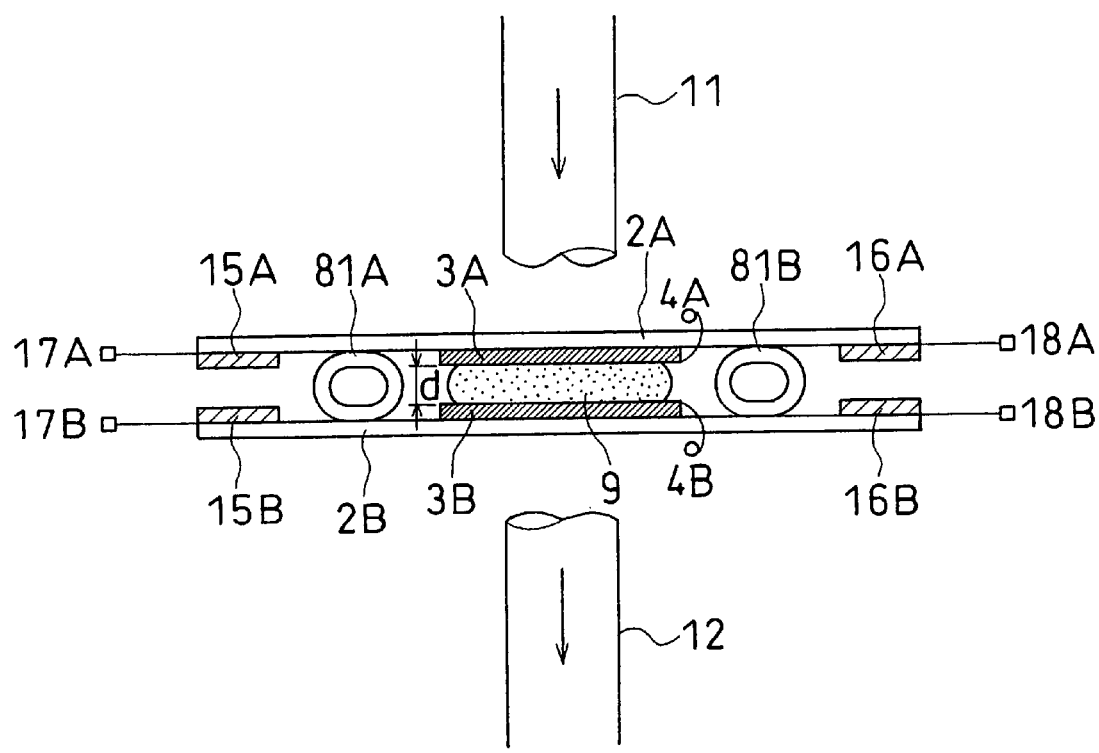
FIG. 7 is a cross section of the essential part of still another embodiment of the present invention.

FIG. 7 shows an embodiment of FIG. 3, wherein flexible spacers 81A, 81B are used as elastic elements. The electrodes 15A, 15B and the electrodes 16A, 16B to control the distance d between the reflector plates 3A, 3B by an electrostatic force are provided near edges to be separated from the reflector plates 3A, 3B for applications of electric field to the liquid crystal material 9.

By controlling the distance d with an applied electric voltage across the terminals 17A and 17b and across the terminals 18A and 18B for distance control, and furthermore by changing the refractive index n of the liquid crystal material 9 with an electric voltage across the terminal 4A and 4B for application of electric field to the liquid crystal material 9, control of optical tunable wavelength is made possible over a wide range of wavelength with fine resolution.

Figure 8:
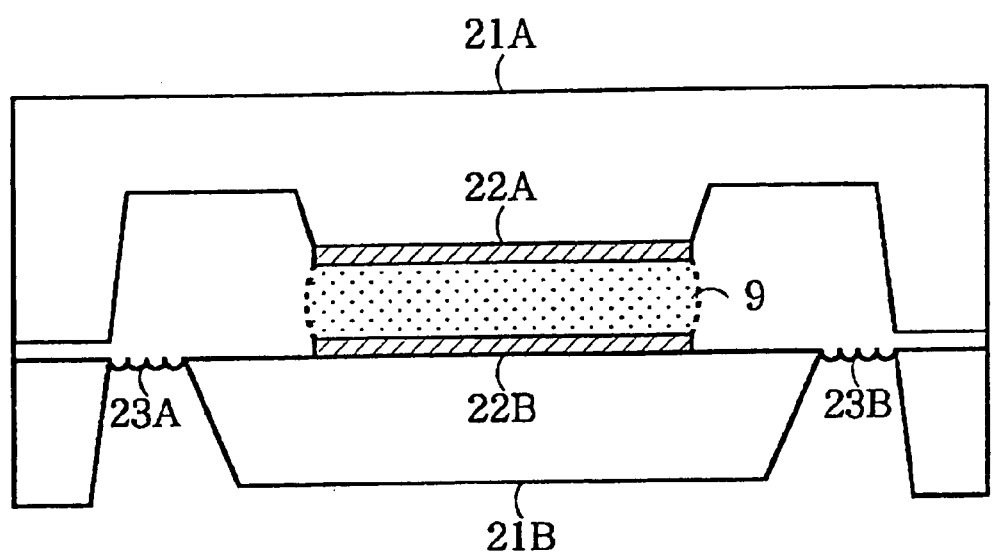
FIG. 8 is a cross section of an embodiment of the present invention wherein Si is used as transparent substrate plate.

FIG. 8 shows an embodiment of the present invention, wherein Si wafers are used as transparent substrate plates. 21A and 21B are the Si transparent substrate plates. Si material is transparent for light of long wavelength. The embodiment shown in FIG. 8 is made by use of micro-machining technology, wherein 22A, 22B are reflecting and conductive layers, and 23A, 23B are flexible structure of corrugation made by micro-machining technology.

The fabrication of the structure is the same as the one described in the IEEE publication, pp.140–144, Proceedings of the Solid-state Sensors and Actuators (Workshop), 1990, IEEE, CH2783-7190/0000-0140, "A miniature Fabry-Perot Interferometer with a Corrugated Silicon Diaphram Support" by J. H. Jerman, D. J. Clift and S. R. Mallinson.

In the above embodiment of the present invention, mechanical, piezo-electric and electrostatic principles are explained as distance changing unit, but electromagnetic principle may be also used as distance changing unit. It is clear that the embodiments described in FIGS. 1–8 are used for the embodiment of optical wavelength tuning method, thus no particular statement on the optical wavelength tuning method of present invention is made.

It should be noted that the present invention is not limited to the aforementioned embodiments.

As explained above, according to the present invention, the change of the distance between the reflector plates and the change of the refractive index of the material are simultaneously used to satisfy the resonant condition, and thus the tunable range can be made very wide with high resolution. The embodiments of the present invention, wherein the reflector plates are also used as the distance changing unit, has special feature of simple structure and small size.

What is claimed is:

1. A Fabry-Perot type optical tuner, comprising:

Fabry-Perot type optical cavity wherein a tuned wavelength changes according to the distance between opposing reflector plates;

a distance changing unit for changing said distance;

liquid crystal material filled in between said opposing reflector plates having a refractive index changeable by an applied electric field to said liquid crystal material; and an electric field applying unit for changing the strength of the electric field applied to said liquid crystal material.

2. A Fabry-Perot type optical tuner according to claim 1, wherein said distance changing unit comprises male screws to fit in female screws provided at plural parts of one of two opposing transparent substrate plates supporting said reflector plates, and the distance between said transparent substrate plates is changed by rotating said male screws.

3. A Fabry-Perot type optical tuner according to claim 1, wherein said distance changing unit comprises piezo-electric elements connecting two opposing transparent substrate plates supporting said reflector plates, and the distance between said transparent substrate plates is changed by applying an electric voltage to said piezo-electric elements to elongate or to shrink said piezo-electric elements.

4. A Fabry-Perot type optical tuner according to claim 1, wherein said distance changing unit comprises:

elastic elements to support elastically two opposing transparent substrate plates supporting said reflector plates; and opposing electrostatic attracting plates provided on said two transparent substrate plates for changing the distance between said transparent substrate plates against the elastic force of said elastic elements by applying an electric voltage to said electrostatic attracting plates.

5. A Fabry-Perot type optical tuner according to claim 4, wherein said electrostatic attracting plates are concurrently said electric field applying unit to the liquid crystal material.

6. A Fabry-Perot type optical tuner according to claim 4, wherein said elastic elements to support elastically the transparent substrate plates are flexible spacers.

* * * * *